(12) United States Patent
Matsuura et al.

(10) Patent No.: US 6,374,884 B2
(45) Date of Patent: Apr. 23, 2002

(54) HEAVY DUTY TIRE INCLUDING NARROW GROOVE

(75) Inventors: Shinichi Matsuura, Kobe; Satoshi Tsuda, Akashi, both of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/467,485

(22) Filed: Dec. 20, 1999

(30) Foreign Application Priority Data

Dec. 21, 1998 (JP) .......................................... 10-363304

(51) Int. Cl.$^7$ ........................ B60C 11/11; B60C 11/12; B60C 107/00
(52) U.S. Cl. .............. 152/209.27; 152/902; 152/DIG. 3
(58) Field of Search .................. 152/209.27, 209.18, 152/DIG. 3, 902

(56) References Cited

U.S. PATENT DOCUMENTS

| 3,498,354 A | * | 3/1970 | Boileau | 152/209.18 |
| 4,265,287 A | | 5/1981 | Abe et al. | |
| 5,010,936 A | * | 4/1991 | Numata et al. | 152/209.27 |
| 5,665,184 A | | 9/1997 | Fukumoto | |

FOREIGN PATENT DOCUMENTS

| CA | 2079712 | * | 4/1993 | 152/209.27 |
| JP | 62-96107 | * | 5/1987 | 152/209.27 |
| JP | 3-186408 | * | 8/1991 | 152/209.27 |
| JP | 5-16615 | * | 1/1993 | 152/209.27 |

OTHER PUBLICATIONS

Patent Abstracts of Japan, vol. 1998, No. 06, Apr. 30, 1998 & JP 10 035223 A (Sumitomo Rubber Ind Ltd), Feb. 10, 1998.
Patent Abstracts of Japan, vol. 1996, No. 03, Mar. 29, 1996 & JP 07 290908 A (Toyo Tire & Rubber Co Ltd), Nov. 7, 1995.
Database WPI, Section Ch, Week 199930, Derwent Publications Ltd., Lundon, GB; Class A95, AN 1993–295702, XP002161782 & FI 103 334 B (Sumitomo Rubber Ind Ltd) Jun. 15, 1999.

* cited by examiner

Primary Examiner—Steven D. Maki
(74) Attorney, Agent, or Firm—Birch, Stewart, Kolasch & Birch, LLP

(57) ABSTRACT

A heavy duty tire comprises a pair of axially outermost circumferential rows of shoulder blocks, each of the shoulder blocks provided with a circumferentially extending narrow groove, the narrow groove subdividing the shoulder block into an axially inner wide main part and an axially outer narrow lateral part, and the narrow groove is curved convexly so that the narrow lateral part is narrower in a middle region than both the circumferential end regions, whereby the heel and toe wear and shoulder wear and resistance to tear-off can be improved.

15 Claims, 6 Drawing Sheets

HEAVY DUTY TIRE INCLUDING NARROW GROOVE

The present invention relates to a heavy duty tire having an improved tread structure capable of preventing uneven wear.

In recent years, tread patterns comprising blocks such as block pattern, rib-block pattern and the like are widely used in not only passenger car tires but also heavy duty tires such as pneumatic tires for trucks, buses and the like.

In the heavy duty tires, the load of each block is relatively heavy, and accordingly uneven wear is very liable to occur. For example, uneven wear between axially outer part and inner part of a block caused by a difference in the rolling diameter of the tire is liable to occur in axially outer blocks such as shoulder blocks. This type of uneven wear is called shoulder wear. Uneven wear at the circumferential edges (heel and toe) of a block is called heel and toe wear, and this type of uneven wear occurs in every block, but the degree is higher in the axially outer blocks such as shoulder blocks.

In order to improve the shoulder wear, it has been proposed to subdivide each shoulder block into an axially outer narrow width part and an axially inner wide part by a narrow groove extending straight in the tire circumferential direction so as to concentrate the wear on the axially outer narrow width part.

In this proposition, however, the heel and toe wear can not be improved, and as the rigidity of the axially outer narrow width part is low, this part is liable to be torn off.

Therefore, it is an object of the present invention to provide a heavy duty tire in which the heel and toe wear as well as shoulder wear is effectively improved and the resistance to tear-off is increased.

According to the present invention, a heavy duty tire comprises
a pair of axially outermost circumferential rows of shoulder blocks,
each of the shoulder blocks provided with a circumferentially extending narrow groove,
the narrow groove subdividing the shoulder block into an axially inner wide main part and an axially outer narrow lateral part, wherein
the narrow groove is curved convexly so that the narrow lateral part is narrower in a substantially middle region than both circumferential end regions in the circumferential direction.

Preferably, the narrow groove has a substantially constant width in the range of from 1.5 to 3.0 mm. The narrow lateral part has a minimum axial width in the range of from 5 to 8% of the average axial width of the shoulder block, and a maximum axial width in the range of from 7 to 12% of the average axial width.

Embodiments of the present invention will now be described in detail in conjunction with the accompanying drawings.

FIGS. 5(A) and 5(B) to FIGS. 7(A) and 7(B) are graphs showing test results.

According to the present invention, a heavy duty tire 1 is provided in the tread 2 with at least two circumferential grooves 3 extending continuously in the tire circumferential direction and axial grooves 4 extending therefrom to the tread edges E.

Figure 2:
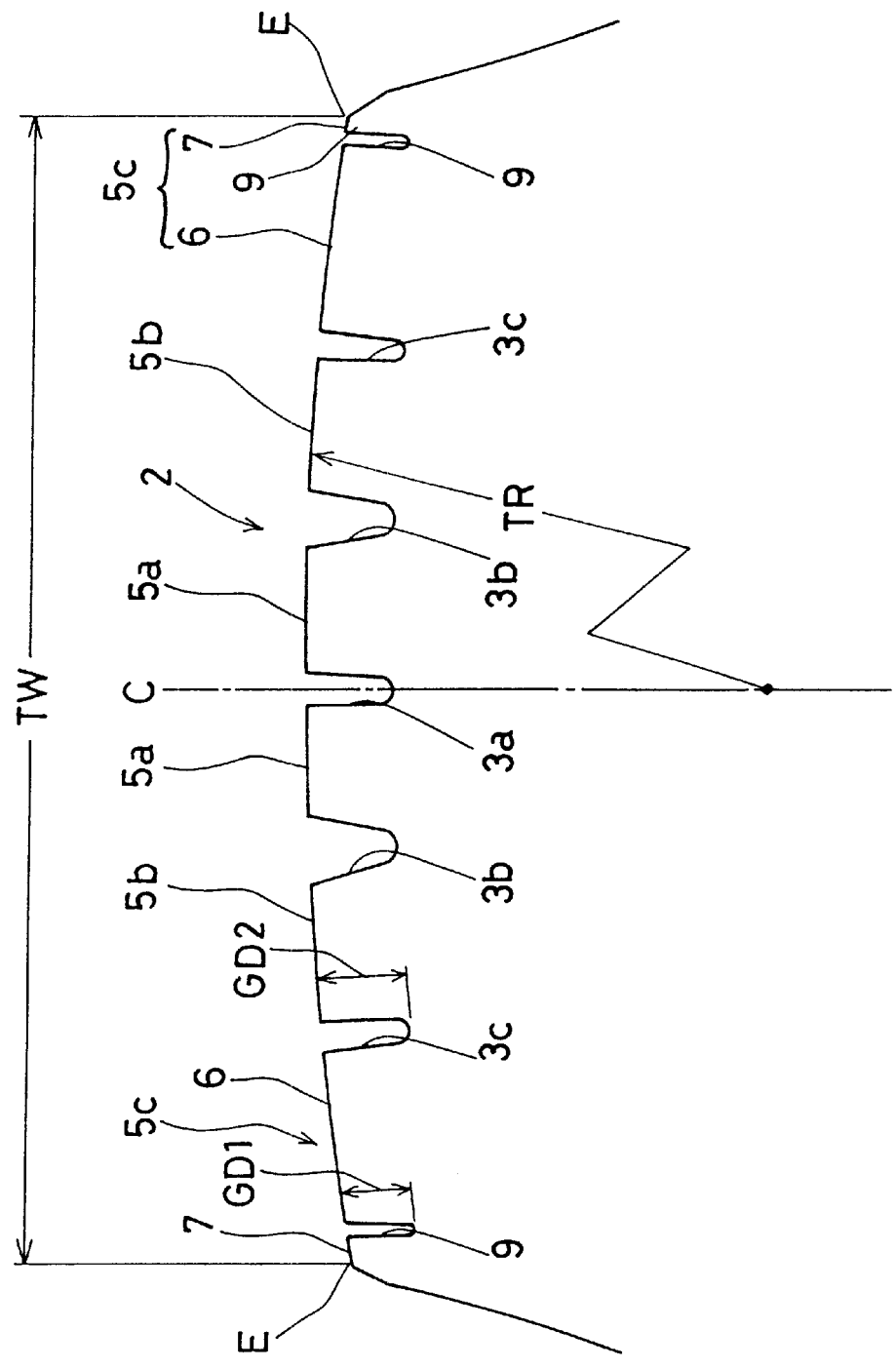
FIG. 2 is a cross sectional view taken along a line A—A in FIG.1.

In this embodiment, the tire is a radial ply tire of size 11R22.5 for trucks and buses. In a meridian section of the tire, the tread 2 has a single radius curvature TR as shown in FIG. 2.

Figure 1:
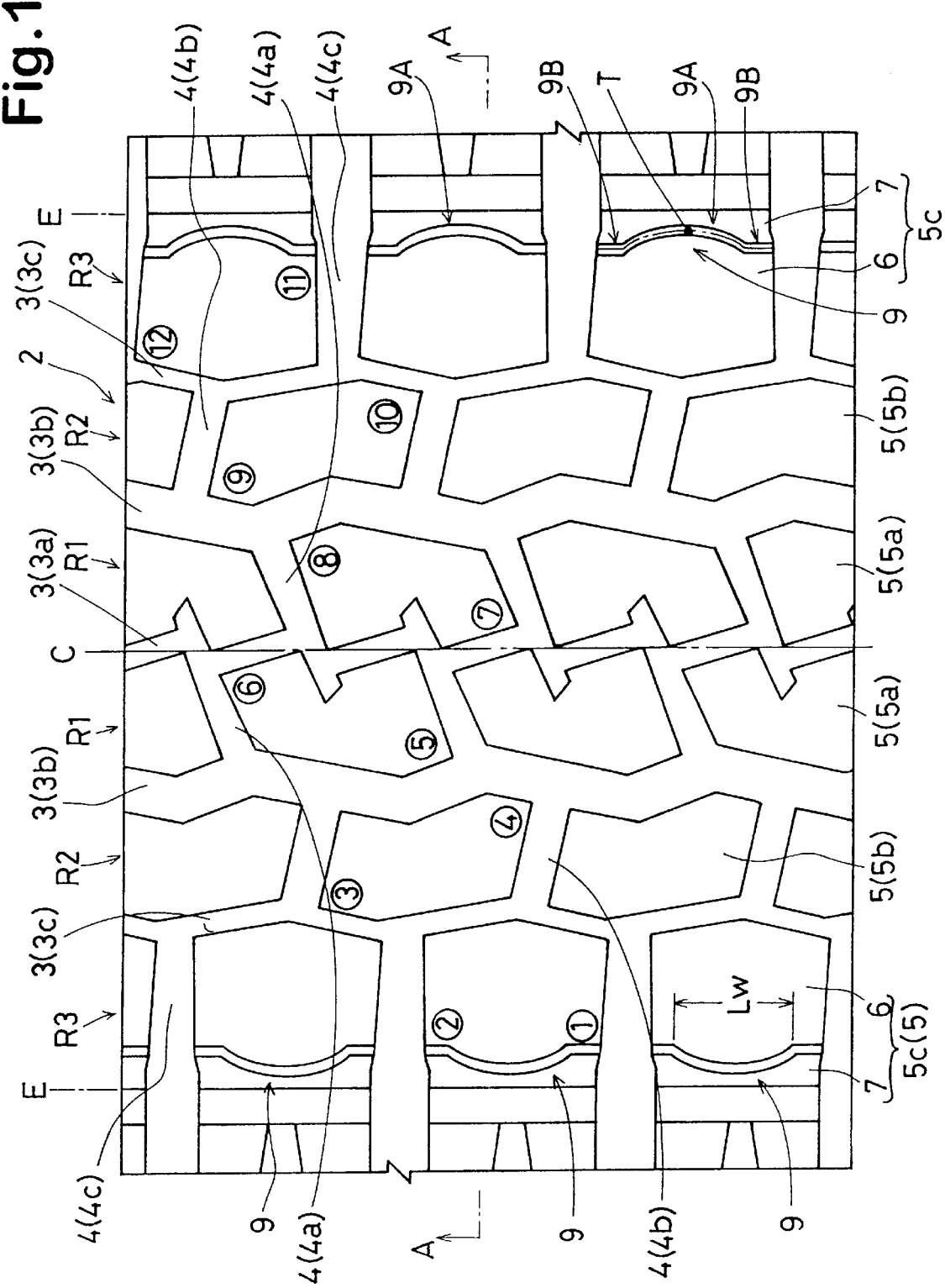
FIG. 1 is a developed view showing a tread pattern according to the present invention.

In FIG. 1, The circumferential grooves 3 include a pair of axially outermost grooves 3c, a pair of axially inner grooves 3b, and a central groove 3a on the tire equator C. Each circumferential groove 3 is a zigzag groove. But various grooves, e.g. straight groove, wavy groove and the like can be used.

The axial grooves 4 include axially outer grooves 4c extending between the outermost circumferential grooves 3c and tread edges E, axially inner grooves 4a extending between the central circumferential groove 3a and the inner circumferential grooves 3b, and middle grooves 4b extending between the inner circumferential grooves 3b and outermost circumferential grooves 3c.

By the circumferential grooves 3 and axial grooves 4, a block pattern made up of a plurality of blocks 5 is formed in the tread 2. These blocks 5 are arranged in a plurality of circumferential rows including two rows R1 of inner blocks 5a between the axially inner grooves 3b, two rows R2 of middle blocks 5b between the axially outermost grooves 3c and the axially inner grooves 3b, and two rows R3 of shoulder blocks 5c axially outside the axially outermost grooves 3c.

Preferably, the circumferential grooves 3 and axial grooves 4 have a width of at least 2% of the tread width TW between the tread edges E.

Here, the tread width TW is the maximum axial width of the ground contacting area under a standard condition in which the tire is mounted on a standard rim and inflated to a standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

Each of the shoulder blocks 5c is provided with a narrow groove 9, whereby the shoulder block 5c is subdivided into an axially inner wide main part 6 and an axially outer narrow lateral part 7. The narrow groove 9 has a width in the range of from 1.5 to 3.0 mm (in this embodiment about 2.0 mm) and a depth GD1 in the range of not less than 30%, preferably 50 to 100%, more preferably 55 to 80% of the depth GD2 of the axially outermost circumferential grooves 3c. Both the circumferential ends thereof are opened to the outer axial grooves 4c circumferentially adjacent to the shoulder blocks 5c.

Figure 3:
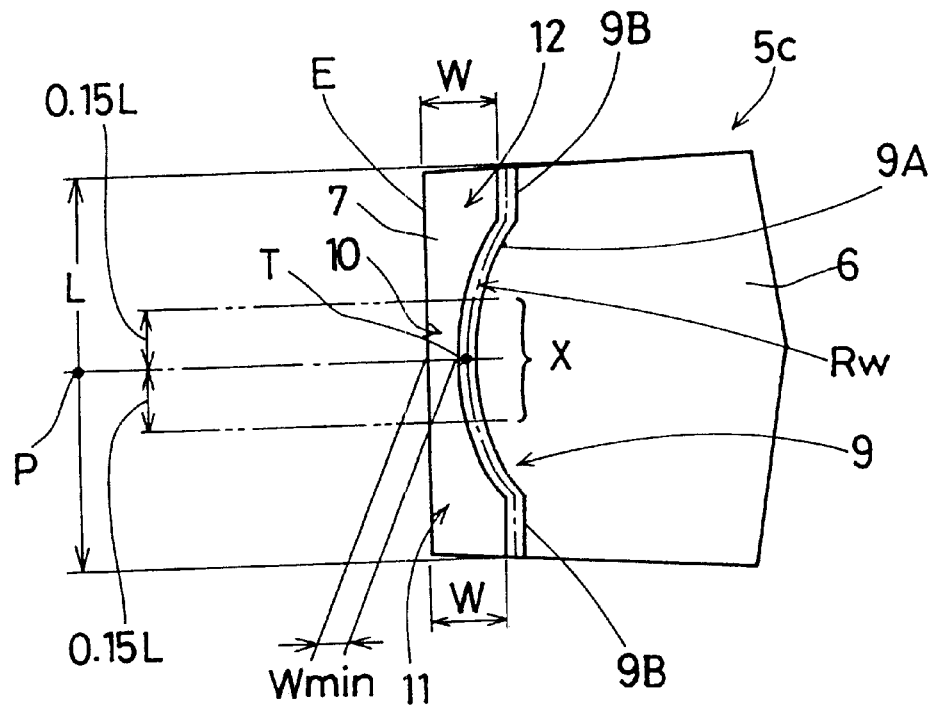
FIG. 3 is a plan view of a shoulder block showing an example of the narrow groove.

FIG. 3 shows an example of the narrow groove 9, wherein the narrow groove 9 comprises a central convex part 9A and a pair of circumferential end parts 9B.

The convex part 9A is curved convexly towards the axially outside, and the axially outermost point T (defined on the groove center line) lies in the middle range X of the circumferential length L of the block. Therefore, the narrow lateral part 7 has a narrow width part 10 in the middle range X and wide parts (hereinafter heel part 11 and toe part 12) in the circumferential ends. Here, the middle range X is, as shown in FIG. 3, a 30% length range centered on the circumferential midpoint P.

Preferably, the convex part 9A has a radius Rw of curvature (defined by the groove center line) in the range of from 0.8 to 2.0 times the average width of the shoulder block.

Further, the convex part 9A has a circumferential length Lw not less than 50%, preferably not less than 60% of the circumferential length L of the narrow groove 9 (in this embodiment about 80%).

Accordingly, the rigidity of the narrow lateral part 7 varies in the tire circumferential direction. Therefore, even if a large tangential force is applied to the top of the shoulder block 5c when contacting or leaving the ground for example, excessive deformation and tear-off of the narrow lateral part 7 can be avoided because the wide heel part 11 and toe part 12 can resist such deformation and tear-off, and the narrow groove 9 can be closed to increase the apparent rigidity of the narrow lateral part 7. Further, wear energy concentrates on the narrow lateral part 7 and wear energy to the main part 6 decreases and uneven wear as a whole is improved.

If the minimum axial width Wmin in the narrow part 10 is too small, such advantageous effects can not be obtained. Therefore, the minimum axial width Wmin is preferably set in the range of from 5 to 8% of the average axial width of the shoulder block 5c.

In FIG. 3, the wide heel part 11 and toe part 12 have a constant axial width W because the circumferential end parts 9B of the narrow groove 9 and the axially outer edge E of the shoulder block 5c are substantially parallel with the tire circumferential direction.

Figure 4:
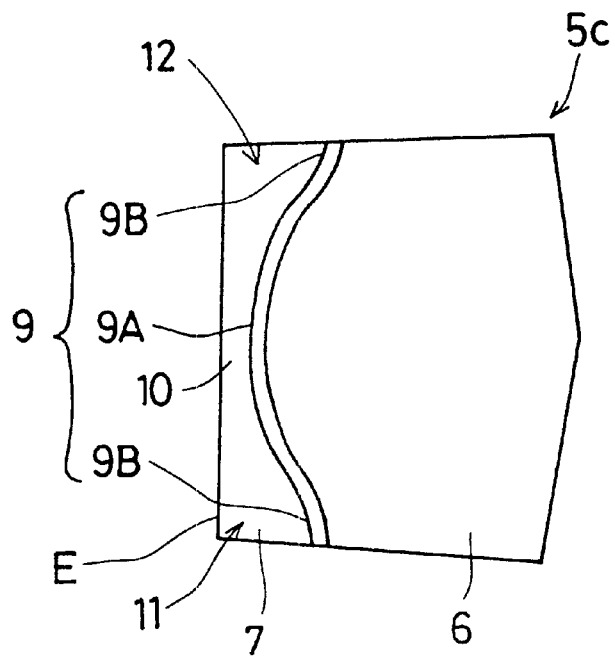
FIG. 4 is a plan view of a shoulder block showing another example of the narrow groove.
Figure 5A:
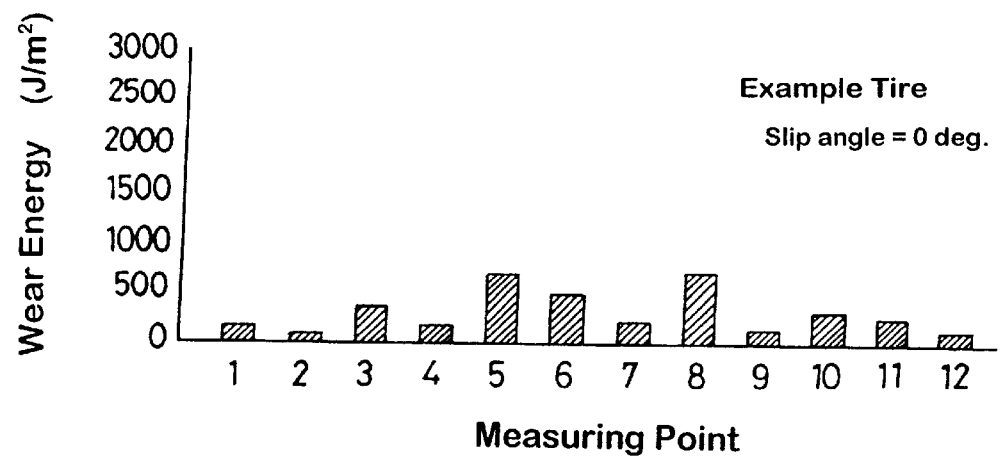
Figure 5B:
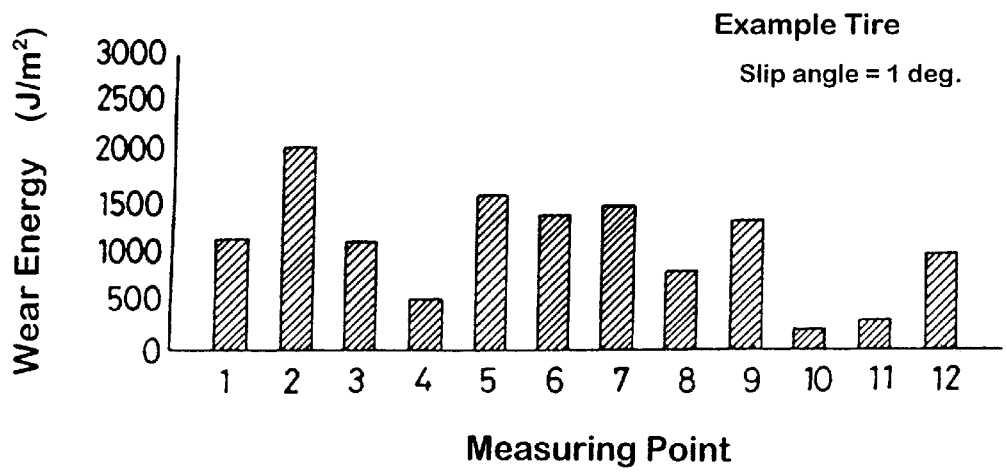
Figure 6A:
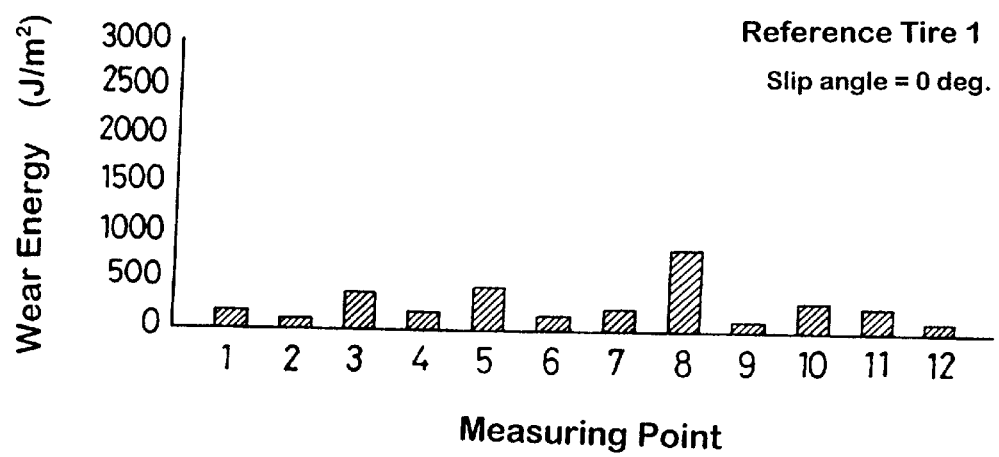
Figure 6B:
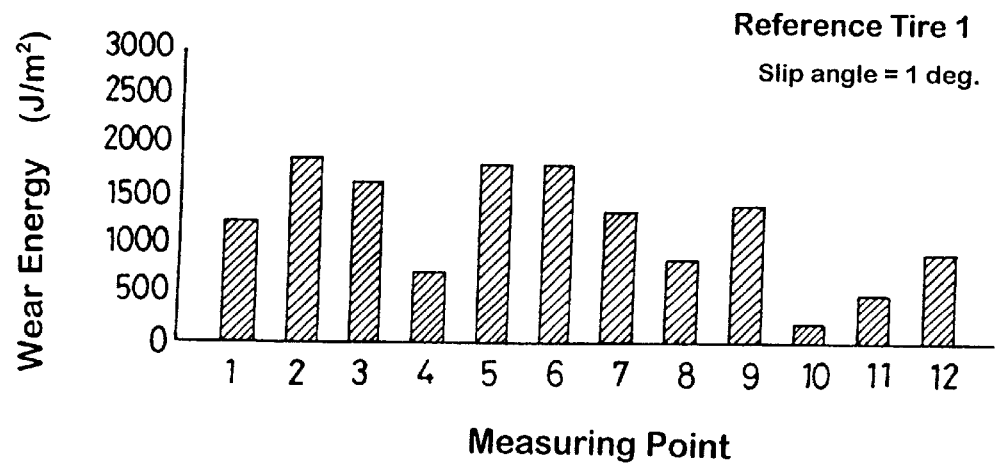
Figure 7A:
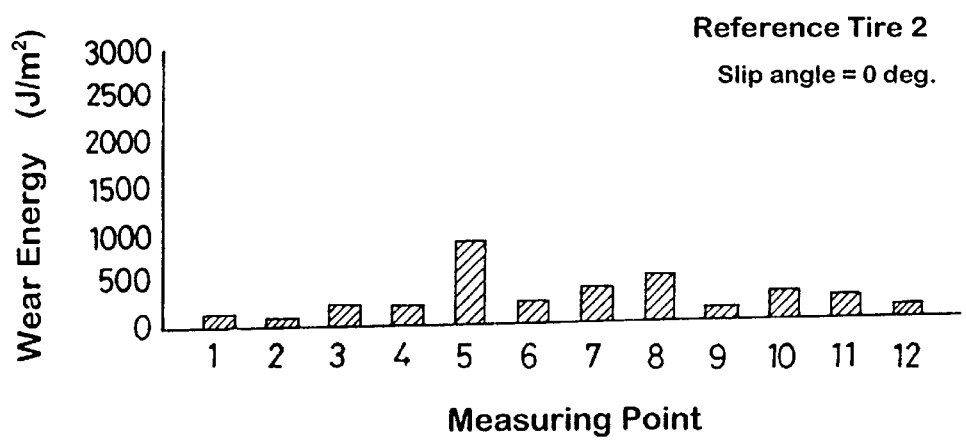
Figure 7B:
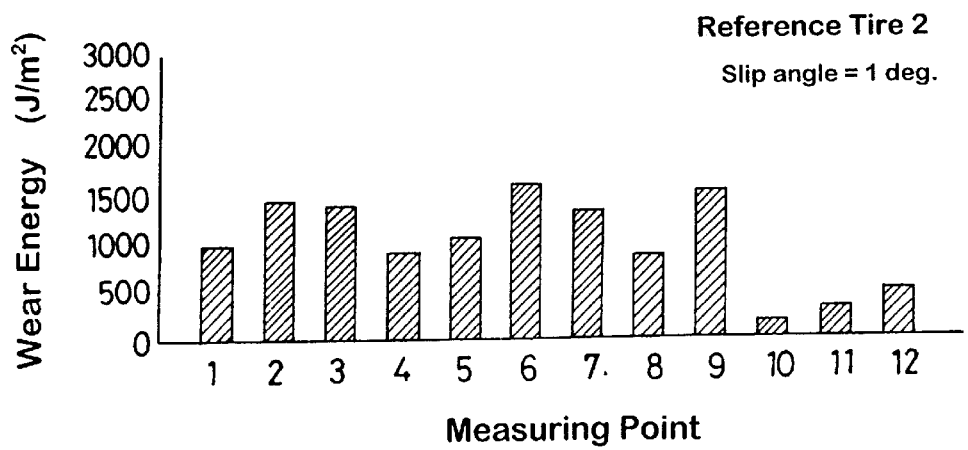

FIG. 4 shows another example of the narrow groove 9. In this example, the heel part 11 and toe part 12 have a variable axial width gradually increasing towards the respective circumferential ends. In this case, the circumferential end parts 9B of the narrow groove 9 are oblique and preferably formed in a linear shape or slightly concavely curved shape.

Preferably, the axial width W of the narrow lateral part 7 measured at the circumferential ends (thus which is usually a maximum width) is set in the range of from 7 to 12% of the above-mentioned average width of the shoulder block and more than the above-mentioned minimum width Wmin. If more than 12%, the wear energy to the main part 6 increases. If lass than 7%, the rigidity decreases and the above-mentioned effects can not be obtained.

In the example shown in FIG. 1, the above-mentioned narrow grooves 9 are provided on only the axially outermost shoulder blocks 5c. However, it is possible to further provide the narrow grooves 9 on the second outermost blocks (in this example middle blocks 5b) such that that the narrow lateral part 7 faces the outermost circumferential groove 3c.

Comparison Test

Truck/bus radial tires of size 11R22.5 (Wheel rim: 22.5× 7.50) having the same tread pattern shown in FIG. 1 except for the narrow grooves were made as test tires and tested for wear energy. Example tire was provided with the narrow grooves 9 shown in FIG. 1. Reference tire 1 was provided with straight narrow grooves instead of the curved narrow grooves 9. Reference tire 2 was not provided with the narrow groove.

Using a combination sensor capable of measuring a share stress and slip and their directions, the share stress and slip were measured at the heel and toe of various blocks (measuring points are indicated in FIG. 1 as ① to ⑫, and the wear energy was computed by multiplying these values. The test conditions are as follows:

Slip angle: 0 and 1 degrees
Inner pressure: 850 kPa
The results are shown in FIGS. 5(A)–5(B) to FIGS. 7(A)–7(B). From the test results, it was confirmed that the tire according to the present invention can be decreased in the difference in wear energy between the heel and toe and thus the wear energy can be evened in the circumferential direction.

Further, the average of the wear energies at the above-mentioned twelve measuring points, and the ratio of the average of the wear energies at the six toe-side measuring points to the average of the wear energies at the six heel-side measuring points were computed. The results are shown in the following Table 1.

TABLE 1

| Tire | Ex. | Ref. 1 | Ref. 2 |
|---|---|---|---|
| Average wear energy (J/sq.m) | | | |
| Slip angle 0 deg. | 295.9 | 278.7 | 326.2 |
| Slip angle 1 deg. | 1011.4 | 1180.8 | 1081.6 |
| Wear energy ratio | 1.5 | 1.56 | 1.8 |

Example tire was slightly increased in the average wear energy in comparison with Reference tire 1, but the wear energy ratio was effectively reduced. Therefore, Example tire could be improved in the wear resistance in its entirety.

What is claimed is:

1. A heavy duty tire comprising
a pair of axially outermost circumferential rows of shoulder blocks disposed in a tread,
each of the shoulder blocks provided with a single circumferentially extending narrow groove,
the narrow groove subdividing the shoulder block into an axially inner wide main part and an axially outer narrow lateral part, and
the narrow groove having a substantially constant width of from 1.5 to 3.0 mm and comprising a convexly curved portion in a substantially middle region of the shoulder block with respect to the circumferential direction,
the circumferential length of the convexly curved portion being not less than 50% of the circumferential length of the narrow groove so that said narrow lateral part is narrower in said middle region of said narrow lateral part than in both circumferential end regions of said narrow lateral part in the circumferential direction.

2. The heavy duty tire according to claim 1, wherein
a minimum axial width of said narrow lateral part in the middle region is in the range of from 5 to 8% of the average axial width of the shoulder block.

3. The heavy duty tire according to claim 2, wherein the narrow groove comprises a central convexly curved part and a pair of circumferential end parts, and the circumferential end parts are substantially straight.

4. The heavy duty tire according to claim 2, wherein the narrow groove comprises a central convexly curved part and a pair of circumferential end parts, and the circumferential end parts are concavely curved.

5. The heavy duty tire according to claim 1, wherein
said narrow lateral part has a minimum axial width in the range of from 5 to 8% of the average axial width of the shoulder block, and a maximum axial width in the range of from 7 to 12% of the average axial width.

6. The heavy duty tire according to claim 5, wherein the narrow groove comprises a central convexly curved part and a pair of circumferential end parts, and the circumferential end parts are substantially straight.

7. The heavy duty tire according to claim 5, wherein the narrow groove comprises a central convexly curved part and a pair of circumferential end parts, and the circumferential end parts are concavely curved.

8. The heavy duty tire according to claim 1, wherein the narrow groove comprises a central convexly curved part and a pair of circumferential end parts, and the circumferential end parts are substantially straight.

9. The heavy duty tire according to claim 8, wherein the circumferential end parts are inclined so that the axial width of the narrow lateral part gradually increases towards both the circumferential ends thereof.

10. The heavy duty tire according to claim 8, wherein the circumferential end parts extends substantially parallel with the circumferential direction.

11. The heavy duty tire according to claim 8, wherein the convexly curved part has a radius of curvature in the range of from 0.8 to 2.0 times the average axial width of the shoulder block.

12. The heavy duty tire according to claim 1, wherein the narrow groove comprises a central convexly curved part and a pair of circumferential end parts, and the circumferential end parts are concavely curved.

13. The heavy duty tire according to claim 12, wherein the circumferential end parts are inclined so that the axial width of the narrow lateral part gradually increases towards both the circumferential ends thereof.

14. The heavy duty tire according to claim 12, wherein the circumferential end parts extends substantially parallel with the circumferential direction.

15. The heavy duty tire according to claim 12, wherein the convexly curved part has a radius of curvature in the range of from 0.8 to 2.0 times the average axial width of the shoulder block.

* * * * *